US010241130B2

(12) United States Patent
Reddy et al.

(10) Patent No.: US 10,241,130 B2
(45) Date of Patent: Mar. 26, 2019

(54) CIRCUIT AND METHOD TO DETECT FAILURE OF SPEED ESTIMATION/SPEED MEASUREMENT OF A MULTI-PHASE AC MOTOR

(71) Applicant: Microsemi SoC Corporation, San Jose, CA (US)

(72) Inventors: Prakash Reddy, Hyderabad (IN); Ashwin Murali, Hyderabad (IN); Pinninti Arjun, Hyderabad (IN)

(73) Assignee: Microsemi SoC Corporation, San Jose, CA (US)

( * ) Notice: Subject to any disclaimer, the term of this patent is extended or adjusted under 35 U.S.C. 154(b) by 323 days.

(21) Appl. No.: 15/239,035

(22) Filed: Aug. 17, 2016

(65) Prior Publication Data
US 2017/0052208 A1    Feb. 23, 2017

(30) Foreign Application Priority Data

Aug. 18, 2015  (IN) .......................... 3136/MUM/2015

(51) Int. Cl.
*G01P 3/44* (2006.01)
*G01P 21/02* (2006.01)
(Continued)

(52) U.S. Cl.
CPC ............. *G01P 21/02* (2013.01); *G01P 3/44* (2013.01); *H02P 6/16* (2013.01); *H02P 6/181* (2013.01); *H02P 21/18* (2016.02)

(58) Field of Classification Search
CPC ....................................................... G01P 21/02
(Continued)

(56) References Cited

U.S. PATENT DOCUMENTS 6,456,908 B1  9/2002 Kumar
7,042,180 B2  5/2006 Terry et al.
(Continued)

OTHER PUBLICATIONS

Francisco A.S. Neves, et al., "An Evaluation of Sensorless Induction Motor Drives for Low Speed Operation," Universidade Federal de Pernambuco, the Georgia Institute of Technology and the Universidade Federal de Minas Gerais, Jan. 1999, 7 pages.

(Continued)

*Primary Examiner* — Walter L Lindsay, Jr.
*Assistant Examiner* — Philipmarcus T Fadul
(74) *Attorney, Agent, or Firm* — Glass and Associates; Kenneth D'Alessandro; Kenneth Glass

(57) ABSTRACT

A method for detecting failure of speed measurement of a multi-phase AC motor includes (1) sensing current drawn by the motor, (2) sensing voltage magnitude supplied to the motor, (3) measuring motor speed, (4) calculating motor speed, (5) determining whether the difference between the measured motor speed and the calculated motor speed is greater than a predetermined threshold, if the difference between the measured motor speed and the calculated motor speed is not greater than a predetermined threshold, repeating (1) through (5), if the difference between the measured motor speed and the calculated motor speed is greater than a predetermined threshold, indicating a fault, if a fault is indicated, performing a predetermined number of restart attempts, if the motor is successfully restarted, repeating (1) through (5), if the motor is not successfully restarted, indicating a restart failure.

9 Claims, 5 Drawing Sheets

(51) Int. Cl.
  *H02P 6/16*    (2016.01)
  *H02P 6/18*    (2016.01)
  *H02P 21/18*   (2016.01)

(58) Field of Classification Search
  USPC .......................................................... 73/1.37
  See application file for complete search history.

(56) References Cited

U.S. PATENT DOCUMENTS

| | | | |
|---|---|---|---|
| 8,975,845 B2 | 3/2015 | Guzelgunler | |
| 2012/0062157 A1* | 3/2012 | Ota | H02P 21/18 |
| | | | 318/400.21 |
| 2015/0266462 A1* | 9/2015 | Johri | B60W 10/02 |
| | | | 701/22 |

OTHER PUBLICATIONS

Kun Zhao, et al., "Speed Estimation of Induction Motor using Modified Voltage Model Flux Estimation" IEEE, School of Electrical Engineering, Beijing Jiaotong University, Beijing, 2009, 4 pages.

Bekheira Tabbache, et al., "DSP-Based Sensor Fault-Tolerant Control of Electric Vehicle Powertrains" IEEE, 2011, 6 pages.

\* cited by examiner

CIRCUIT AND METHOD TO DETECT FAILURE OF SPEED ESTIMATION/SPEED MEASUREMENT OF A MULTI-PHASE AC MOTOR

CROSS-REFERENCE TO RELATED APPLICATIONS

This application claims priority from Indian Patent Application No. 3136/MUM/2015, filed Aug. 18, 2015, the contents of which are incorporated in this disclosure by reference in their entirety.

BACKGROUND OF THE INVENTION

Field of Invention

The present invention relates to multiphase AC motor technology. More particularly, the present invention relates to apparatus and a method to detect failure of a speed estimation or speed measurement of a multiphase AC motor.

Background Art

Speed control of a multiphase AC motor requires knowledge of the speed of the motor. The speed of a motor may be determined using a speed sensor (encoder, resolver, tachometer, etc.) or a speed estimator if the motor is operating in sensor-less mode. Speed sensors provide accurate speed information over an entire operating range, but add additional cost to the overall system and are susceptible to failure over the long term due to environmental and other factors. Motor speed estimation provides reliable speed values at higher speed ranges, but not at lower speed ranges and during a motor startup period.

There are several methods of speed estimation based on motor equivalent models and are built based on motor parameters that are fixed for a particular motor. The general method is to provide to a motor model values of voltages that are fed to an actual motor and determine the difference between the actual currents measured at the motor and the expected currents that are computed using the motor model. The difference is then forced to zero by dynamically adjusting the motor model. The dynamically adjusted motor model provides speed information.

The speed estimator may fail to detect a locked rotor condition and continue to estimate non-zero speed even though the motor is not rotating. In this condition, it is not possible to know whether the motor has actually started. Also in the case where a synchronous motor is running in the speed range that can be reliably estimated by the speed estimator, when a sudden load torque that is more than the motor can deliver is applied to the motor, a loss of synchronization can occur. This condition is called rotor slip. The speed estimator may fail in this condition as well and can provide incorrect speed estimates from thereon even after the sudden load torque has been removed. There is also a need to validate the speed that has been measured by sensors, as sensors are prone to failure.

Therefore, there is a need for an apparatus and methods to detect failure of a speed estimator or speed measurement of a multiphase AC motor, which are not associated with these disadvantages.

BRIEF SUMMARY OF THE INVENTION

According to one embodiment of the present invention, a method for detecting failure of speed measurement of a multi-phase AC motor includes (1) sensing current drawn by the motor, (2) sensing voltage supplied to the motor, (3) measuring the motor speed from a sensor, (4) calculating the motor speed, (5) determining whether the difference between the measured motor speed and the calculated motor speed is greater than a predetermined threshold, if the difference between the measured motor speed and the calculated motor speed is not greater than a predetermined threshold, repeating (1) through (5), if the difference between the measured motor speed and the calculated motor speed is greater than a predetermined threshold, indicating a fault, if a fault is indicated, performing a predetermined number of restart attempts, if the motor is successfully restarted during the predetermined number of restart attempts, repeating (1) through (5), if the motor is not successfully restarted during the predetermined number of restart attempts, indicating a restart failure.

According to another embodiment of the present invention, a method for detecting failure of speed estimation of a multi-phase AC motor includes (1) sensing current drawn by the motor, (2) sensing voltage magnitude and voltage angle supplied to the motor, (3) estimating motor speed, (4) calculating motor speed, (5) determining whether the difference between the estimated motor speed and the calculated motor speed is greater than a predetermined threshold, if the difference between the estimated motor speed and the calculated motor speed is not greater than a predetermined threshold, repeating (1) through (5), if the difference between the estimated motor speed and the calculated motor speed is greater than a predetermined threshold, indicating a fault, if a fault is indicated, performing a predetermined number of restart attempts, if the motor is successfully restarted during the predetermined number of restart attempts, repeating (1) through (5), if the motor is not successfully restarted during the predetermined number of restart attempts, indicating a restart failure.

According to another embodiment of the present invention an apparatus for detecting failure of speed measurement of a multi-phase AC motor includes at least one sensor coupled to the motor to sense current drawn by the motor and measure motor speed, a voltage-sensing connection to a motor control circuit driving the motor to sense voltage supplied to the motor, a motor speed calculating circuit coupled to the at least one sensor, and a speed validation circuit coupled to the voltage sensing connection and the motor speed calculating circuit and configured to determine whether the difference between the measured motor speed and the calculated motor speed is greater than a predetermined threshold, to indicate a fault if the difference between the measured motor speed and the calculated motor speed is greater than the predetermined threshold, to perform a predetermined number of restart attempts, and to indicate a restart failure if the motor is not successfully restarted during the predetermined number of restart attempts.

According to one embodiment of the present invention, the speed validation circuit includes a calculating circuit to calculate motor speed, a difference circuit to measure a difference between a motor speed calculated by the calculating circuit and measured motor speed, and a threshold circuit to output a fault signal if the difference between the motor speed calculated by the calculating circuit and the measured motor speed is greater than a predetermined threshold. The motor speed calculating circuit and the speed validation circuit can include a processor programmed to calculate motor speed, measure a difference between a motor speed calculated by the calculating circuit and measured motor speed, and output a fault signal if the difference between the motor speed calculated by the calculating circuit and the measured motor speed is greater than a predetermined threshold.

According to another embodiment of the present invention, an apparatus for detecting failure of speed estimation of a multi-phase AC motor includes a sensor coupled to the motor to sense current drawn by the motor, a voltage-sensing connection to a motor control circuit driving the motor to sense voltage supplied to the motor, a motor speed estimating circuit coupled to the sensor and the voltage-sensing connection, a motor speed calculating circuit coupled to the sensor and the voltage-sensing connection, and a speed validation circuit coupled to the motor speed estimating circuit and the motor speed calculating circuit and configured to determine whether the difference between an estimated motor speed developed in the motor speed estimating circuit and a calculated motor speed developed in the motor speed calculating circuit is greater than a predetermined threshold, to indicate a fault if the difference between the measured motor speed and the calculated motor speed is greater than the predetermined threshold, to perform a predetermined number of restart attempts, and to indicate a restart failure if the motor is not successfully restarted during the predetermined number of restart attempts.

According to one embodiment of the present invention, the speed validation circuit includes a calculating circuit to calculate motor speed, a difference circuit to measure a difference between a motor speed calculated by the calculating circuit and estimated motor speed, and a threshold circuit to output a fault signal if the difference between the motor speed calculated by the calculating circuit and the estimated motor speed is greater than a predetermined threshold. The motor speed calculating circuit and the speed validation circuit comprise a processor programmed to calculate motor speed, measure a difference between a motor speed calculated by the calculating circuit and estimated motor speed, and output a fault signal if the difference between the motor speed calculated by the calculating circuit and the estimated motor speed is greater than a predetermined threshold.

According to one embodiment of the present invention, the speed validation circuit includes a calculating circuit to calculate motor speed, a difference circuit to measure a difference between a motor speed calculated by the calculating circuit and estimated motor speed, and a threshold circuit to output a fault signal if the difference between the motor speed calculated by the calculating circuit and the estimated motor speed is greater than a predetermined threshold. The motor speed calculating circuit and the speed validation circuit may include a processor programmed to calculate motor speed, measure a difference between a motor speed calculated by the calculating circuit and estimated motor speed, and output a fault signal if the difference between the motor speed calculated by the calculating circuit and the estimated motor speed is greater than a predetermined threshold.

BRIEF DESCRIPTION OF THE SEVERAL VIEWS OF THE DRAWINGS

These and other features, aspects and advantages of the present invention will become better understood with regard to the following description, appended claims, and accompanying drawings where:

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons.

Figure 1:
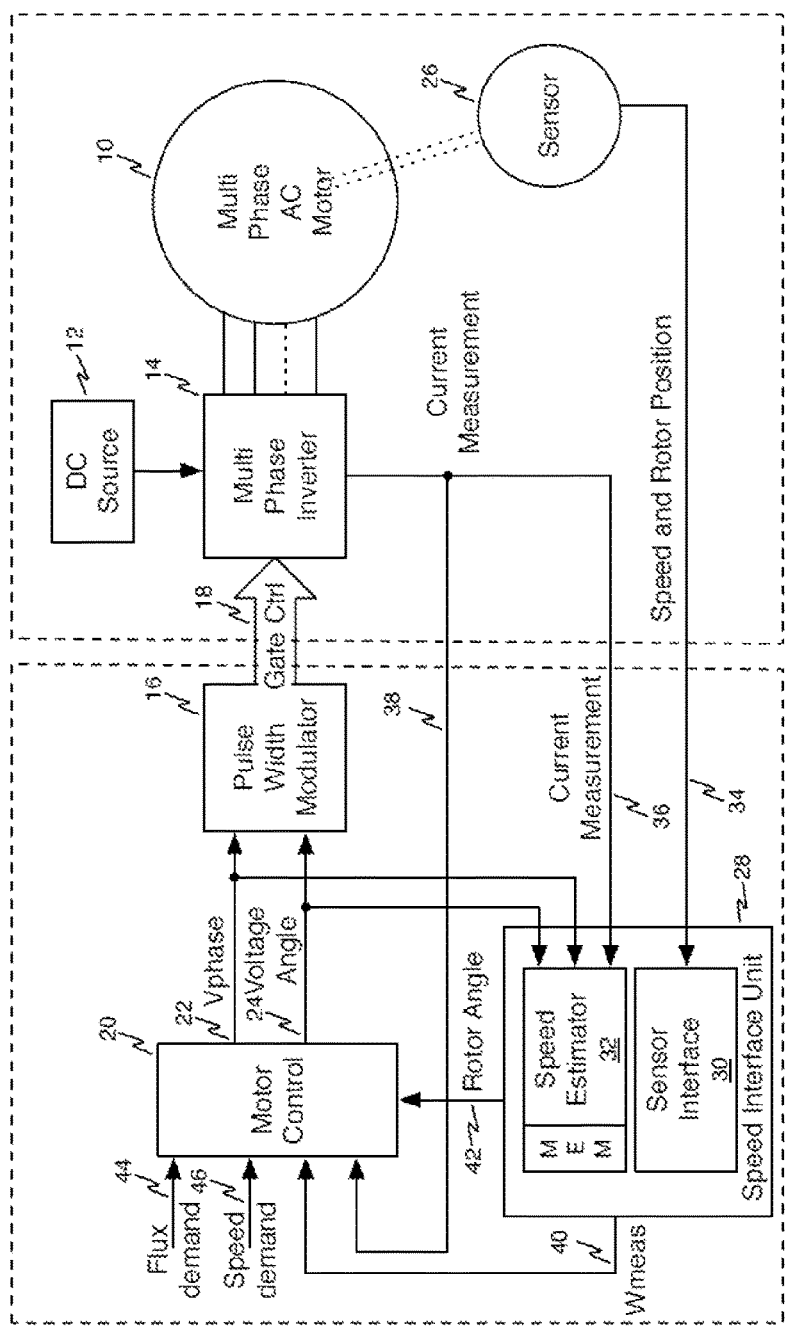
FIG. 1 is a block diagram that shows a prior-art circuit used to estimate or measure the speed of a multiphase AC motor.

Referring first to FIG. 1, a block diagram shows a prior-art motor speed estimator circuit used to estimate the speed of a multiphase AC motor 10. Multiphase AC motor 10 is driven from a DC source 12. The output of DC source 12 is converted to multiphase AC power by multiphase inverter 14. The multiphase inverter 14 converts DC power from the DC source 12 to variable voltage and variable frequency AC power in multiple phases. A 3-phase inverter is the most widely used form of multi-phase inverter where there are three phase outputs generally displaced by 120 degrees.

The speed of the multiphase AC motor 10 is controlled by a pulse width modulator 16 that provides gate control signals for the multiphase inverter 14 on lines 18. The pulse width modulator 16 is controlled by a motor control circuit 20 that employs an algorithm to provide a voltage magnitude signal 22, denoted Vphase, and a voltage angle signal 24 to a pulse width modulator 16. The motor control circuit 20 may include a microprocessor or a microcontroller.

The arrangement and operation of multiphase AC motor 10, DC source 12, multiphase inverter 14, pulse width modulator 16, and motor control circuit 20 are well known in the art.

A sensor 26 coupled to the shaft of the multiphase motor 10 senses the speed and rotor position of the multiphase motor 10. A speed interface unit 28 includes a sensor interface 30 and an estimator unit 32. The sensor interface 30 converts the raw signals received from sensor 26 (e.g., an angular encoder, resolver, etc.) to speed and position information of the rotor of the multiphase AC motor 10. The speed estimator unit 32 is supplied with a current measurement signal from the multiphase inverter 14 on lines 36, the voltage magnitude signal 22 ($V_{phase}$) from motor control circuit 20 and the voltage angle signal 24 from the motor speed control circuit 20. The current measurement signal is also supplied to motor control circuit 20 on lines 38. Speed interface unit 28 provides a speed signal $W_{meas}$ obtained from either sensor interface 30 or speed estimator 32 to motor control unit 20 on line 40. Speed interface unit 28 also provides a rotor angle signal obtained from either sensor interface 30 or speed estimator 32 to motor control unit 20 on line 42. Motor control unit 20 is driven by a flux demand input 44 and a speed demand input 46. Inputs 44 and 46 are user inputs and depend on the particular application.

There are several methods of speed estimation based on the use of motor equivalent models that are built based on motor parameters fixed for a particular motor. The general method is to feed the voltages that are fed to the actual multiphase AC motor 10 through motor control circuit to a motor model and find the difference between actual measured currents and the currents computed through motor model. The difference is then forced to zero by dynamically adjusting the motor model.

In the circuit depicted in FIG. 1, the speed estimator unit 32 in speed interface unit 28 performs this function. The voltage magnitude signal 22, denoted $V_{phase}$, and the voltage angle signal 24 from the motor control unit 20 are fed to the speed estimator unit 32. The current measurement from the multiphase inverter 14 is also fed to the speed estimator unit 32. A motor equivalent model (MEM) for the multiphase AC motor 10 is resident in the speed estimator unit 32. The dynamically adjusted motor model in the speed estimator unit 32 as part of speed interface 28 provides speed information $W_{meas}$ on line 40.

As previously noted, the speed interface unit 28 of the circuit of FIG. 1 may fail to detect a locked rotor condition and continue to estimate non-zero speed even though motor is not rotating. In this condition, it is not possible to know whether the motor has actually started. Also in the case where a synchronous motor is running in the speed range that can be reliably estimated by speed estimator, when there is a sudden load torque that is more than the motor can deliver, a loss of synchronization (called rotor slip) can occur. The speed estimator unit 32 may fail in this condition as well and can estimate incorrect speed from thereon even after the sudden load torque has been removed. In addition, the speed sensor 26 may fail and provide incorrect speed information to the speed sensor interface 30. In each of these cases, incorrect speed information will be provided on line 40 to motor control circuit 20.

Figure 2:
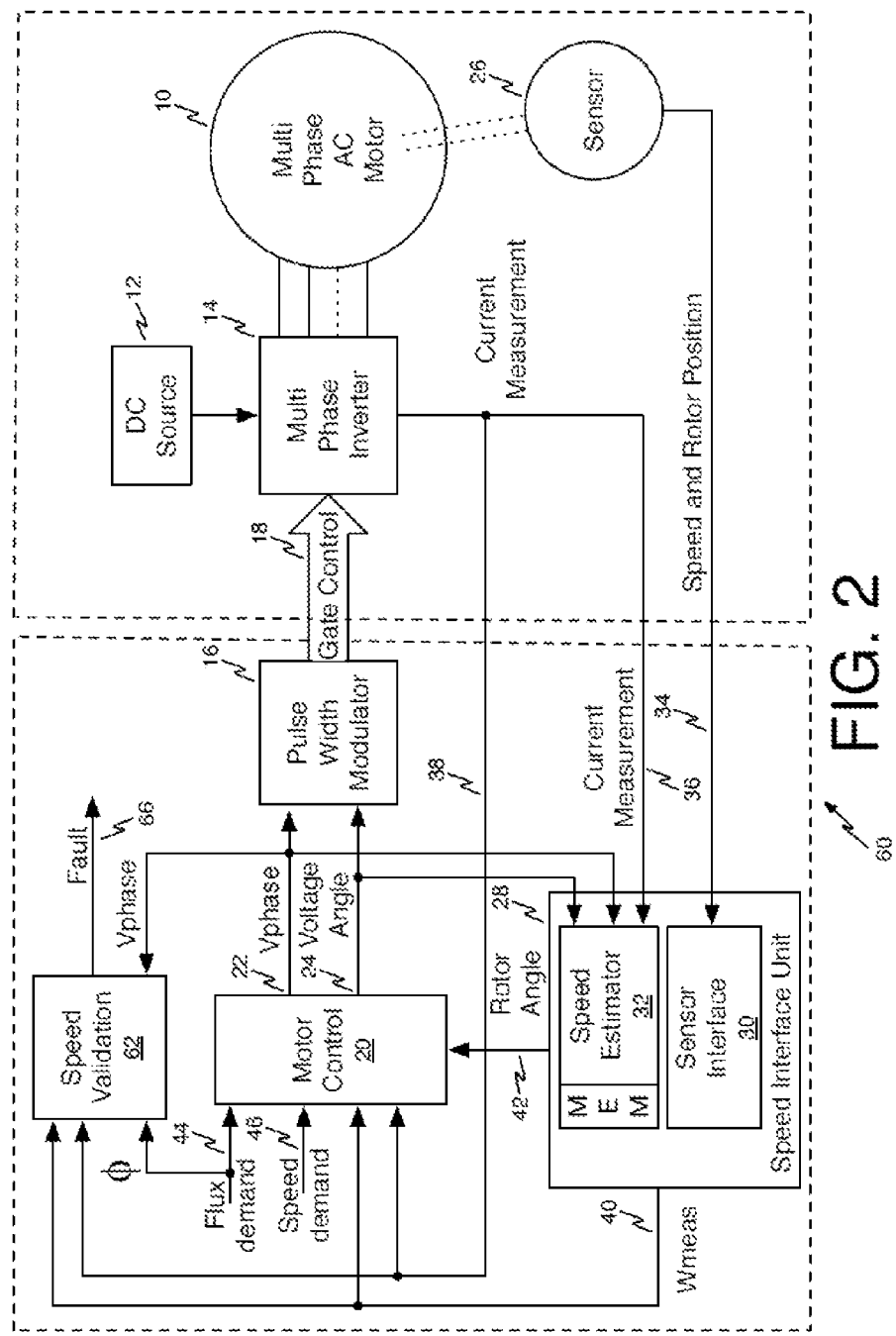
FIG. 2 is a block diagram that shows an illustrative motor speed estimator circuit used to estimate and detect failure of the speed of a multiphase AC motor in accordance with one aspect of the present invention.

Referring now to FIG. 2, a block diagram shows an illustrative circuit 60 used to detect failure of estimation/measurement of the speed of multiphase AC motor 10 in accordance with one aspect of the present invention. Where elements of the circuit of FIG. 2 correspond to elements of the circuit of FIG. 1, they are designated by the same reference numerals used to identify the corresponding circuit elements of FIG. 1.

Multiphase AC motor 10 is driven from a DC source 12. The multiphase inverter 14 converts DC power from the DC source 12 to variable voltage and variable frequency AC power in multiple phases. A 3-phase inverter is the most widely used form of multi-phase inverter 14 where there are three phase outputs generally displaced by 120 degrees, but persons of ordinary skill in the art will readily observe that multiphase systems having a number of phases other than three are within the scope of the present invention.

The speed of the multiphase AC motor 10 is controlled by pulse width modulator 16 that provides gate control signals for the multiphase inverter 14 on lines 18. The pulse width modulator 16 is controlled by motor control circuit 20 that provides a voltage magnitude signal 22 and a voltage angle signal 24 to pulse width modulator 16.

A sensor 26 coupled to the shaft of the multiphase motor 10 senses the speed and rotor position of the multiphase motor 10. A speed interface unit 28 includes a sensor interface 30 and a speed estimator unit 32. The sensor interface 30 converts the raw signals received from sensor 26 (e.g., an angular encoder, resolver, tachometer) to speed and position information of the rotor of the multiphase AC motor on lines 34. The speed estimator unit 32 is supplied with a current measurement signal from the multiphase inverter 14 on lines 36, a voltage magnitude signal 22, denoted $V_{phase}$, and a voltage angle signal 24 from the motor speed control circuit 20. The current measurement signal is also supplied to motor control circuit 20 on lines 38. Speed interface unit 28 provides a speed signal $W_{meas}$ obtained from either sensor interface 30 or speed estimator 32 to motor control unit 20 on line 40. Speed interface unit 28 also provides a rotor angle signal to motor control unit 20 on line 42. Motor control unit 20 is driven by a flux demand input 44 and a speed demand input 46. Inputs 44 and 46 are user inputs and depend on the particular application.

There are several methods of speed estimation based on the use of motor equivalent models that are built based on motor parameters fixed for a particular motor. Any of those methods may be utilized in the present invention. The general method is to feed the voltages that are fed to the actual multiphase AC motor 10 through the motor control circuit 20 to a motor model and find the difference between actual measured currents and the currents computed through motor model. The difference is then forced to zero by dynamically adjusting the motor model.

The speed estimator unit 32 in speed interface unit 28 performs the methods of speed estimation referred to herein. The voltage magnitude signal 22, ($V_{phase}$) and the voltage angle signal 24 from the motor control circuit 20 are fed to the speed estimator unit 32 in the speed interface unit 28. The current measurement from the multiphase inverter 14 is also fed to the speed estimator unit 32. A motor equivalent model (MEM) for the multiphase AC motor 10 is resident in the speed estimator unit 32. The dynamically adjusted motor model in the speed estimator unit 32 provides speed information $W_{meas}$ on line 40.

As may be seen from FIG. 2 a speed validation unit 62 receives inputs from the speed output 42 of speed interface unit 28, the flux demand input 46 to motor control unit 20, the $V_{phase}$ signal 22 of motor control unit 20, and the current measurement signal from multiphase inverter 14 on line 40. A fault output 66 indicates that a motor speed fault has been detected.

Figure 3:
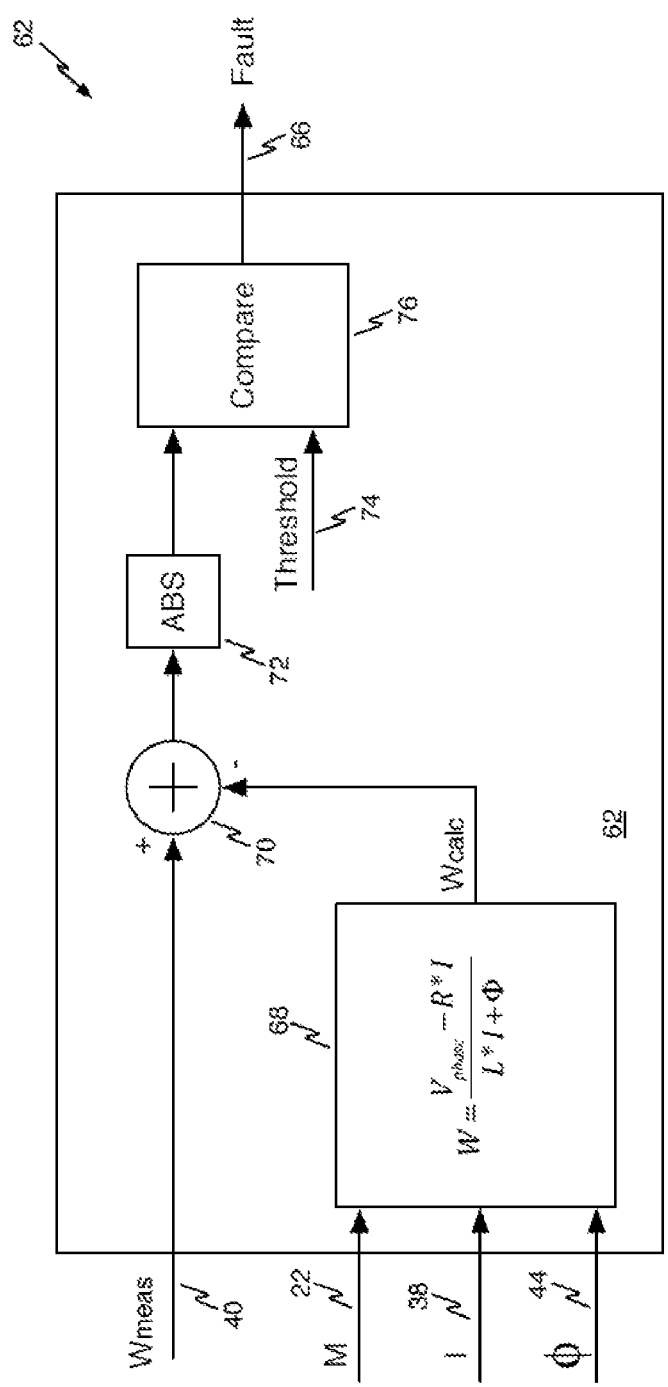
FIG. 3 is a block diagram of an illustrative speed validation unit that may be used in the present invention.

According to the present invention, the measured speed output $W_{meas}$ 40 from speed interface unit 28 is fed to speed validation unit 62 and is compared with a value computed based on motor voltage magnitude, i.e. $V_{phase}$ 22 from the motor control 20, flux demand 44 and actual motor current, i.e. current measurement on lines 38, and validates the estimated/measured speed. Referring now to FIG. 3, an illustrative embodiment of a speed validation unit 62 is shown.

The per phase motor voltage can be represented by equation [1]:

$$V_{phase}=R*I+L*W*I+E \qquad [1]$$

Where I=RMS current
W=Motor speed (measured/estimated) in rad/sec
R=Motor per phase resistance
L=Motor per phase inductance
E=Back-emf per phase
Back-e is a function of motor flux and speed and can be expressed by equation [2]:

$$E=\Phi*W \qquad [2]$$

Where Φ=Motor flux
Equation 1 can be rephrased using equation [2] as below $$V_{phase}=R*I+W(L*I+\Phi) \qquad [3]$$

Equation [3] can be used to find the speed value:

$$W = \frac{V_{phase} - R*I}{L*I + \Phi} \quad [4]$$

The value of W computed from equation [4] is used to validate estimated/measured speed. If the difference between the estimated/measured speed and the speed computed from equation [4] is less than a threshold value, the estimated/measured speed is a proper value. Otherwise, the speed value from estimator/speed measurement is not reliable (fault case). In this case, depending on the application in which the motor is used, the motor can be stopped or a restart command can be issued to start the motor from zero speed. The number of auto restarts can be limited to a certain number, after which the motor will be stopped and restart is not attempted.

The threshold value is fixed based on speed sensor/estimator tolerance values parameter tolerance and variation with respect to temperature (R, L, Φ). The percentage tolerance should be equal to the sum of the percentage tolerances and variations of speed sensor/estimator and motor parameter values R, L, Φ.

When the absolute value of the difference is greater than threshold value a fault signal is generated that indicates speed estimation/measurement failure.

In case of a permanent magnet synchronous motor, the flux magnitude (I) is fixed by the rotor construction and hence is a constant. For large motors having low resistance, the term R*I in equation [4] can be ignored.

Referring now to FIG. 3, a block diagram shows an illustrative speed validation unit 62 that may be used in the present invention. A computational unit 68 computes equation [4] from inputs Vphase on line 22, I, the current measurement from lines 38 of FIG. 2, and Φ from line 44 of the circuit of FIG. 2. Computational unit 68 may be in the form of a microprocessor or microcontroller.

The output $W_{calc}$ of computational unit 68 is subtracted from the output $W_{meas}$ of speed interface unit 28 in adder 70. The absolute value of the result is provided by absolute value circuit 72. The absolute value of the result is compared with the threshold 74 at comparator 76. The output of comparator 76 is the fault signal 66 of FIG. 2.

Figure 4:
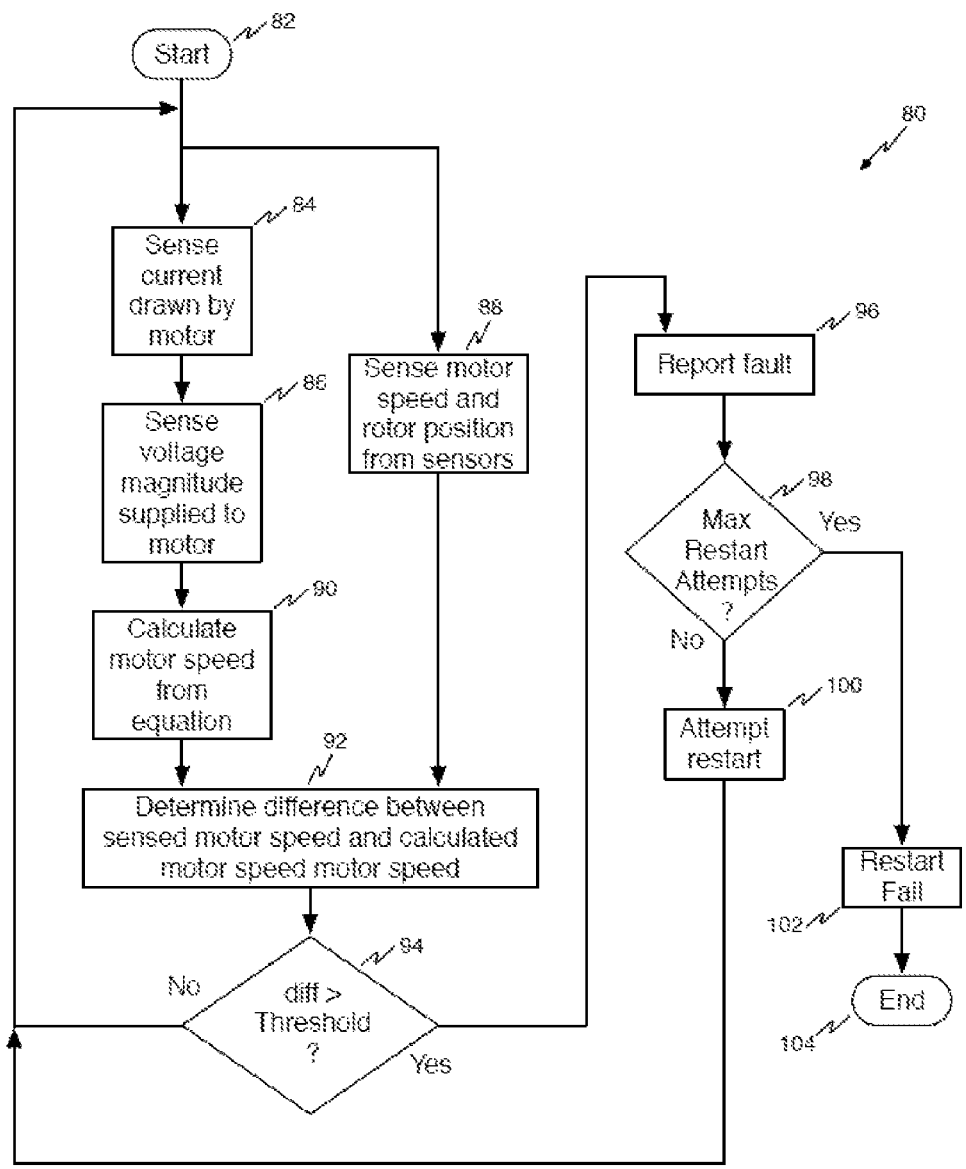
FIG. 4 is a flow diagram showing an illustrative method to detect failure of a speed measurement of a multiphase AC motor in accordance with the present invention.

Referring now to FIG. 4, a flow diagram shows an illustrative method 80 to detect failure of a speed measurement of a multiphase AC motor in accordance with the present invention.

The method begins at reference numeral 82. At reference numeral 84 current drawn by the motor is sensed, at reference numeral 86 voltage magnitude supplied to the motor is sensed, and at reference numeral 88, the motor speed and rotor position are sensed from the sensor 26. Persons of ordinary skill in the art will observe that the order of sensing the current, the voltage, the motor speed, and the rotor position is not important.

At reference numeral 90, the motor speed is calculated from equation [4] as disclosed herein. At reference numeral 92 the difference between the sensed motor speed and the calculated motor speed is determined.

At reference numeral 94, it is determined whether the measured value and the calculated value differ by less than a threshold amount. If the measured value and the calculated value differ by less than the threshold amount, the method again performs its sensing and calculating functions.

If the measured value and the calculated value differ by greater than the threshold amount, the method proceeds to reference numeral 96 at which a fault is reported. The process then proceeds to reference numeral 98 where the process determines whether a maximum number of restart attempts have been made. If not, a motor re-start is attempted at reference numeral 100 and the method again performs its sensing and calculating functions.

If, at reference numeral 98 it is determined that a maximum number of restart attempts have been made, the process proceeds to reference numeral 102 where the process reports a restart failure. The process ends at reference numeral 104. The maximum number of restart attempts is dependent on application and decided by the user.

Figure 5:
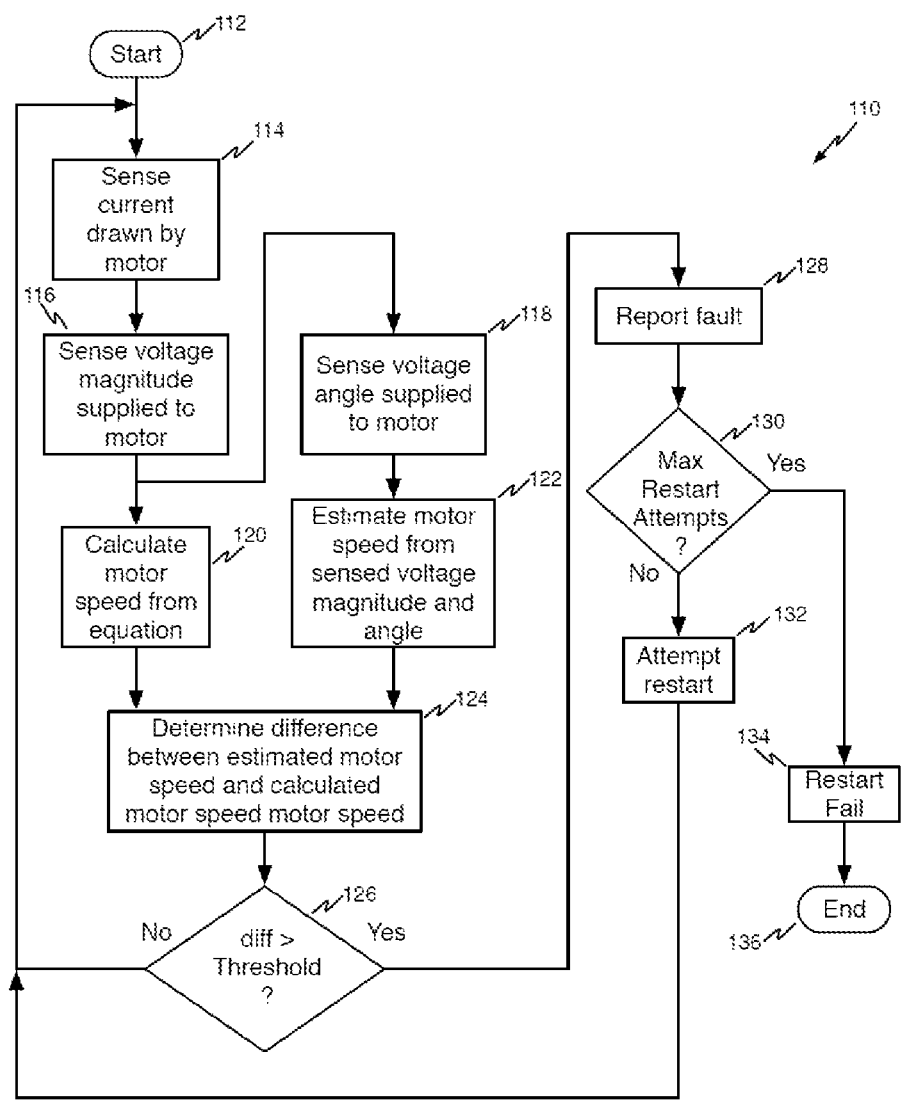
Referring now to FIG. 5, a flow diagram shows an illustrative method to detect failure of a speed estimation of a multiphase AC motor in accordance with the present invention.

Referring now to FIG. 5, a flow diagram shows an illustrative method 110 to detect failure of a speed estimation of a multiphase AC motor in accordance with the present invention.

The method begins at reference numeral 112. At reference numeral 114 current drawn by the motor is sensed. At reference numeral 116 the magnitude of the voltage supplied to the motor is sensed. At reference numeral 118 the angle of the voltage supplied to the motor is sensed. At reference numeral 120, the motor speed is calculated from equation [4]. At reference numeral 122, the motor speed is estimated from the sensed voltage magnitude and angle and motor current. Persons of ordinary skill in the art will observe that the order of sensing the voltage magnitude, voltage angle, and current is not important.

At reference numeral 124 the difference between the estimated motor speed and the calculated motor speed is determined.

At reference numeral 126, it is determined whether the estimated value and the calculated value differ by less than a threshold amount. If the estimated value and the calculated value differ by less than the threshold amount, the method again performs its sensing, estimating, and calculating functions.

If the estimated value and the calculated value differ by greater than the threshold amount, the method proceeds to reference numeral 128 at which a fault is reported. The process then proceeds to reference numeral 130 where the process determines whether a maximum number of restart attempts have been made. If not, a motor re-start is attempted at reference numeral 132 and the method again performs its sensing and calculating functions.

If, at reference numeral 130 it is determined that a maximum number of restart attempts have been made, the process proceeds to reference numeral 134 where the process reports a restart failure. The process ends at reference numeral 136. The maximum number of restart attempts is dependent on application and decided by the user.

The present invention can be used to detect failure of the speed estimation and speed measurement. The present invention can be used to detect a locked motor rotor during motor startup and sensor/estimation failure during normal operating conditions.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A method for detecting failure of speed measurement of a multi-phase AC motor comprising:
   (1) sensing current drawn by the motor;
   (2) sensing voltage magnitude supplied to the motor;
   (3) measuring, by a sensor, a speed of the motor;
   (4) calculating the speed of the motor;
   (5) determining whether the difference between the measured motor speed and the calculated motor speed is greater than a predetermined threshold;
   if the difference between the measured motor speed and the calculated motor speed is not greater than a predetermined threshold, repeating (1) through (5);
   if the difference between the measured motor speed and the calculated motor speed is greater than the predetermined threshold, indicating a fault;
   if a fault is indicated, performing a predetermined number of restart attempts;
   if the motor is successfully restarted during the predetermined number of restart attempts, repeating (1) through (5);
   if the motor is not successfully restarted during the predetermined number of restart attempts, indicating a restart failure.

2. A method for detecting failure of speed estimation of a multi-phase AC motor comprising:
   (1) sensing current drawn by the motor;
   (2) sensing voltage magnitude and voltage angle supplied to the motor;
   (3) estimating a speed of the motor;
   (4) calculating the speed of the motor;
   (5) determining whether the difference between the estimated motor speed and the calculated motor speed is greater than a predetermined threshold;
   if the difference between the estimated motor speed and the calculated motor speed is not greater than the predetermined threshold, repeating (1) through (5);
   if the difference between the estimated motor speed and the calculated motor speed is greater than the predetermined threshold, indicating a fault;
   if a fault is indicated, performing a predetermined number of restart attempts;
   if the motor is successfully restarted during the predetermined number of restart attempts, repeating (1) through (5);
   if the motor is not successfully restarted during the predetermined number of restart attempts, indicating a restart failure.

3. A method for detecting failure of speed measurement of a multi-phase AC motor comprising:
   (1) sensing current drawn by the motor;
   (2) sensing voltage magnitude and voltage angle supplied to the motor;
   (3) performing one of measuring a speed of the motor from a sensor and estimating the speed of the motor;
   (4) calculating the speed of the motor;
   (5) determining whether the difference between the one of measured motor speed and estimated motor speed and the calculated motor speed is greater than a predetermined threshold;
   if the difference between the one of measured motor speed and estimated motor speed and the calculated motor speed is not greater than a predetermined threshold, repeating (1) through (5);
   if the difference between the one of measured motor speed and estimated motor speed and the calculated motor speed is greater than the predetermined threshold, indicating a fault;
   if a fault is indicated, performing a predetermined number of restart attempts;
   if the motor is successfully restarted during the predetermined number of restart attempts, repeating (1) through (5);
   if the motor is not successfully restarted during the predetermined number of restart attempts, indicating a restart failure.

4. Apparatus for detecting failure of speed measurement of a multi-phase AC motor comprising:
   at least one sensor coupled to the motor to sense current drawn by the motor and measure a speed of the motor;
   a voltage-sensing connection to a motor control circuit driving the motor to sense voltage supplied to the motor;
   a motor speed calculating circuit coupled to the at least one sensor; and
   a speed validation circuit coupled to the voltage sensing connection and the motor speed calculating circuit and configured to determine whether the difference between the measured motor speed and the calculated motor speed is greater than a predetermined threshold, to indicate a fault if the difference between the measured motor speed and the calculated motor speed is greater than the predetermined threshold, to perform a predetermined number of restart attempts, and to indicate a restart failure if the motor is not successfully restarted during the predetermined number of restart attempts.

5. The apparatus of claim 4 wherein the speed validation circuit comprises:
   a calculating circuit to calculate motor speed;
   a difference circuit to measure a difference between a motor speed calculated by the calculating circuit and measured motor speed; and
   a threshold circuit to output a fault signal if the difference between the motor speed calculated by the calculating circuit and the measured motor speed is greater than a predetermined threshold.

6. The apparatus of claim 5 wherein the motor speed calculating circuit and the speed validation circuit comprise a processor programmed to calculate motor speed, measure a difference between a motor speed calculated by the calculating circuit and measured motor speed, and output a fault signal if the difference between the motor speed calculated by the calculating circuit and the measured motor speed is greater than a predetermined threshold.

7. Apparatus for detecting failure of speed estimation of a multi-phase AC motor comprising:
   a sensor coupled to the motor to sense current drawn by the motor;
   a voltage-sensing connection to a power supply driving the motor to sense voltage supplied to the motor;
   a motor speed estimating circuit coupled to the sensor and the voltage-sensing connection to estimate a speed of the motor;
   a motor speed calculating circuit coupled to the sensor and the voltage-sensing connection to calculate the speed of the motor; and
   a speed validation circuit coupled to the motor speed estimating circuit and the motor speed calculating circuit and configured to determine whether the difference between the estimated motor speed developed in the motor speed estimating circuit and the calculated motor speed developed in the motor speed calculating circuit is greater than a predetermined threshold, to indicate a fault if the difference between the measured motor speed and the calculated motor speed is greater than the predetermined threshold, to perform a predetermined number of restart attempts, and to indicate a restart failure if the motor is not successfully restarted during the predetermined number of restart attempts.

8. The apparatus of claim 7 wherein the speed validation circuit comprises:
   a calculating circuit to calculate motor speed;
   a difference circuit to measure a difference between a motor speed calculated by the calculating circuit and estimated motor speed; and
   a threshold circuit to output a fault signal if the difference between the motor speed calculated by the calculating circuit and the measured motor speed is greater than a predetermined threshold.

9. The apparatus of claim 7 wherein the motor speed calculating circuit and the speed validation circuit comprise a processor programmed to calculate motor speed, measure a difference between a motor speed calculated by the calculating circuit and measured motor speed, and output a fault signal if the difference between the motor speed calculated by the calculating circuit and the measured motor speed is greater than a predetermined threshold.

* * * * *